United States Patent Office 3,036,918
Patented May 29, 1962

3,036,918
METHOD OF STABILIZING THE FLAVOR OF CASEIN
Winston H. Wingerd, Clifford D. Bauer, and Russell D. Damisch, Elgin, Ill., assignors to The Borden Company, New York, N.Y., a corporation of New Jersey
No Drawing. Filed Dec. 23, 1959, Ser. No. 861,456
5 Claims. (Cl. 99—20)

This invention relates to a flavor stabilized casein composition and the process of making it. The product is particularly useful as a protein supplement for foods and will be illustrated by description in connection with such use.

With caseins previously used for this purpose there has been difficulty because of undesirable flavor development on storage or shelving, particularly without refrigeration.

The present invention provides a casein or alkali caseinate that remains satisfactorily stable in flavor for a period of four months or more at a temperature that, in the tests, was 100° F. It provides a treatment that is more effective, in stabilizing the flavor of casein and of the small proportion of fat normally therein, than is the ascorbic acid content which has been accepted heretofore as a preservative for such products. In fact our process gives better results when it includes, as one step, destruction of the ascorbic acid by oxidation so that the acid does not interfere with our more effective flavor stabilization.

Briefly stated, the invention comprises the process of and the product resulting from degrading casein with a proteolytic enzyme, to an extent increasing the tyrosine content to a level accompanying flavor stabilization but short of causing off flavor characteristic associated with more extensive protein hydrolysis. In the commercial embodiment, the invention comprises continuing the proteolytic action only until the proportion of tyrosine comes to be approximately 0.004–0.025 part for 100 parts of the milk in which the casein is treated or for approximately 2.5 parts of actual casein in the milk, the use as starting material of a milk containing not more than about 0.07% of fat or 1.5% on the weight of the casein, and oxidation irreversibly of the ascorbic acid normally present in the milk.

The term "tyrosine," as used herein, means detectable (i.e., separable) tyrosine, either free or combined in small peptides and determinable by the usual colorimetric method using phosphomolybdotungstic acid in amount to precipitate the casein from its aqueous solution, the precipitated casein being filtered out and the intensity of the blue color in the filtrate being measured, to show the amount of the detectable tyrosine. This tyrosine has been separated from the casein by solubility of the tyrosine and insolubility of the casein in contact with the said acid in water solution. The term excludes tyrosine combined so firmly or in compounds of such complexity as to prevent the tyrosine from showing the tests or reactions upon which its determination depends. The proportion of this detectable tyrosine is an indication of the extent of modification of the casein.

In general, the process of the invention comprises introducing the proteolytic enzyme into skim milk or other sources of milk casein, holding the resulting mixture at the incubation temperature favorable to activity of the enzyme until the tyrosine content is increased to about 4–25 mg. for 100 g. of the milk, oxidizing the ascorbic acid, then adding acid in amount to bring the resulting composition approximately to the isoelectric point for casein, separating the casein so precipitated, washing it and either drying it for use or admixing therewith an alkali such as sodium bicarbonate in amount to form the alkali metal caseinate. In one embodiment, the enzyme treated milk, including the said proportion of tyrosine and without the subequent treatment described, is subjected to spray drying to make a milk powder.

The casein which we ordinarily use is that from raw skim milk free of off flavor and odor and having a fat content by the Mojonnier method of not more than about 0.07%. Such milk will give a final casein product containing not more than approximately 0.05 part of fat for 2.5 parts of casein separated from the milk. Low fat content favors better shelf life of the casein produced. In a modification of the invention the casein may be previously prepared and separated from skim milk by any usual procedure. In such case the separated casein is redispersed in water at a pH above the isoelectric point, as at a pH of about 5 to 6.5, for treatment with the enzyme.

The enzyme is a proteolytic enzyme which is edible, does not itself have an objectionable flavor as used, and is active at incubation temperatures and at the pH of milk, i.e., at about 6.6. Examples of enzymes or enzyme preparations that meet these requirements are pancreatin powder N.F. (National Formulary), a trypsin, as in the form of a concentrate known as Mixase C from the pancreatin powder, bromelin (a protease from pineapple), Rhozyme W–15 (a bacterial protease supplied by Rohm and Haas Company), and any proteolytic fungal enzyme derived from molds that meets the stated requirements. Pepsin may be used with casein that has been preseparated from milk and then dissolved at a pH below its isoelectric point, as at pH around 2, for purposes for which original flavor development would be unobjectionable.

To oxidize the ascorbic acid normally present in milk, we use a mild oxidizing agent such as hydrogen peroxide. We can use, however, alkali metal peroxides such as sodium or potassium peroxide introduced to give about the same oxidation potential $Eh$ as the hydrogen peroxide in the amount used.

The acid used to bring the treated casein solution to the isoelectric point is sulfuric, lactic, acetic, or hydrochloric acid, the latter being the preferred material. Any non-toxic, edible, i.e., food acid may be substituted in place of the acids named provided it will reduce the pH to the isoelectric point without the introduction into the finished product of an objectionably large proportion of ash when the acid used is subsequently neutralized with an alkali.

When alkali is used, as in making the caseinate, the alkali is ordinarily sodium carbonate, bicarbonate, or hydroxide although we may use the corresponding compound of any other non-toxic alkali metal.

The optimum proportion for the pancreatin powder N.F. for flavor stability with minimum protein degradation is 0.0003–0.0015 part for 100 parts of the milk. Because the concentration and activity of various enzyme preparations vary widely, the proportion of the selected enzyme preparation is chosen to bring the tyrosine content to about 0.004–0.025 part for 100 parts of the milk, in 30–60 minutes and at 100°–115° F. For the trypsin concentrate Mixase C, the optimum concentrate is about 1–7 mgs. for 100 lbs. of milk. For bromelin, of activity equal to 1200 gelatin digestion units, the optimum is 1–2 g. for 100 lbs. of milk, i.e., 0.002–0.004 part for 100 of milk.

The proportion of the acid for precipitation of the casein, after incubation with the enzyme, is that required to precipitate the casein with a minimum calcium content, that is, to establish the pH at about 4.1–4.3.

The amount of alkali used, if it is desired to convert the enzyme treated and thus precipitated casein to the caseinate, is that amount ordinarily used for the purpose, as, for instance, sufficient to bring the pH of the casein after the addition of the alkali up to about 6 to 7.5. The resulting dispersion of casein in the aqueous medium is then dried.

The oxidation utilizes the oxidizing agent in amount only to oxidize the ascorbic acid substantially completely. Ordinarily 0.001–0.003 part of hydrogen peroxide (on the anhydrous basis) or the equivalent of sodium peroxide is used for 100 parts of milk.

The enzyme proteolysis is effected at the incubation temperatures that are equal for the particular enzymes selected. Thus we operate satisfactorily in the range 100°–115° F. for this incubation. In an alternative procedure the enzyme is added to the skim milk at about 40°–50° F. and the resulting mixture heated slowly, so as to reach a temperature of about 142° F. in the period of 30–60 minutes.

In any case the enzyme-milk mixture, after the enzyme action has raised the tyrosine content to the said 0.004–0.0025 part, is warmed to the temperature of pasteurization and enzyme inactivation such as 175° F. and held for about 15 minutes. The temperature may be somewhat lower or higher, the exact temperature depending upon the period of time to which the milk is subjected to the elevated temperature.

The oxidizing agent such as hydrogen peroxide is introduced and the temperature held at approximately the same elevated temperature until the ascorbic acid of the milk is substantially completely oxidized. The time recommended is about 30–60 minutes.

The lower the temperature, the longer must be the time allowed for oxidation.

The invention will be further illustrated by description in connection with the following specific examples of the practice of it. In these examples and elsewhere herein, proportions are expressed by weight unless specifically stated to the contrary.

EXAMPLE 1

100 pounds of cold raw skim milk of normal flavor and odor and of fat content not more than 0.07% is stirred with 0.3 g. of pancreatin powder N.F. The resulting mixture is maintained at incubation temperature of 100°–115° F. until the protein degradation liberates approximately 0.15–0.2 g. of tyrosine for 100 g. of casein in the milk, the liberated tyrosine being that measurable in the filtrate from the phosphomolybdotungstic acid precipitation of protetin described herein. The incubation is then discontinued, and the whole then heated to 142° F. and held at that point for 30 minutes, to pasteurize the milk and inactivate the enzyme.

Into the milk at the temperature of about 142° F. aqueous hydrogen peroxide is introduced in the proportion of 20 milliliters of the solution of concentration 3% and the mixture kept at about the temperature stated until examination showed substantially no absorbic acid left therein.

The mixture is then cooled to 90°–105° F., here about 95°, and the pH adjusted to 4.2 by the addition of a food grade of commercial hydrochloric acid of concentration 22° Baumé, the acid being diluted in advance with 8 times its volume of water. The casein precipitates.

The precipitated casein in the form of the curd is settled for 20 minutes or longer if necessary to give the appearance of complete settling. The supernatant liquid is then decanted and settled curd washed with water at about 95° F., the total water used being approximately equal to or more than 100 pounds. The pH is maintained at about 4.3 in this wash water, by the addition of hydrochloric acid as required. The washing by decantation is repated twice more as stated above and the curd drained as completely as possible after the last wash.

The curd so made may be dried in any usual manner for drying casein and shipped for use where casein is required and where a stabilized flavor is desirable.

EXAMPLE 2

The casein after the last washing in Example 1 is treated with sodium bicarbonate in amount to dissolve the casein. Thus there are introduced 45 g. of sodium bicarbonate in sufficient water to give the concentration desired in the finished sodium casein, as for instance, total water in proportion of approximately 8 parts of water to 1 of casein on the dry weight. The addition of the bicarbonate is made in aqueous solution at 160° F., and suitably in association with a metal sequestering agent for sequestering iron or other heavy metal ions which may be present at this stage as impurities. Such ions if present and not removed, catalyze oxidation in the finished product, particularly oxidation of any fat present. Suitable sequestering agents are sodium or potassium citrate, lactate, and tartrate. Here the agent used was sodium citrate in the amount of 3 g.

We find that the proportion of the alkali to use in this casein dissolving stage is the amount which will establish the pH of a 3% casein solution of the product at about 6.3–7.1.

EXAMPLE 3

The composition and procedure of Example 1 or 2 are followed except that any of the other proteolytic enzymes disclosed are substituted for the pancreatin N.F. and used at enzyme concentration, incubation and later at enzyme inactivation temperature that is conventional for the selected enzyme in other proteolyses. Thus if pepsin is used, the incubation pH is about 3.5.

Also any of the other alkalies disclosed are substituted for the sodium bicarbonate and any of the other acids for the hydrochloric acid, in each case to establish the pH levels stated for the various steps.

EXAMPLE 4

The procedure of Example 1 is followed through the stage at which the incubation of the mixture of the milk and the proteolytic enzyme and the peroxide oxidation of ascorbic acid are completed. The resulting mixture is then heated to about 165° F., to effect pasteurization and to inactivate the enzyme. The product is then spray dried in manner usual for milk.

The product as made is useful as a skim milk powder.

EXAMPLE 5

The procedure of Example 4 is repeated except that whole milk is substituted for the skim milk. The product is a whole milk of improved stability of flavor as compared to that made likewise but without the enzyme incubation step.

The effect of the enzyme (pancreatin powder N.F.) on the tyrosine content of the incubated milk is shown in Table 1.

*Table 1*

| Composition of Mixture Treated | Tyrosine [1] Conc., g./100 g. milk |
|---|---|
| Cold Raw Milk | 0.0027 |
| Raw milk held at 110° F. for 30 min. with 0.14 g. enzyme/100 lbs | 0.0041 |
| Raw milk held at 110° F. for 30 min. with 0.7 g. enzyme/100 lbs | 0.0052 |

[1] The tyrosine referred to here, as elsewhere herein, is that in the filtrate from the phosphomolybdotungstic acid precipitation of casein. The amount of this tyrosine is a measure of the extent of proteolysis and accompanying other change produced in the incubated milk.

The effect on flavor stability of representative enzyme-treated and untreated sodium bicarbonate dispersion of casein is shown in Table 2.

Table 2
FLAVOR STABILITY OF SODIUM CASEINATE

| Preparation No. | Days Storage at 100° F. Before Developing Off Flavor | |
|---|---|---|
| | No Treatment | Treated As Described |
| 1 | 28 | |
| 2 | 56 | |
| 3 | | 132 |
| 4 | | 126+ |
| 5 | | 49+ |
| 6 | | 47+ |
| 7 | | 42+ |

+ means still good on latest observation.

In use of our improved casein, it is substituted pound for pound for conventional food grade casein in food supplementation, as in admixture with wheat flour, corn flake cereal, or other food materials for which fortification is desirable.

It will be understood that it is intended to cover all changes and modifications of the examples of the invention herein chosen for the purpose of illustration which do not constitute departures from the spirit and scope of the invention.

We claim:

1. In stabilizing the flavor of milk casein, the process which comprises mixing the casein in dispersed condition with an edible proteolytic enzyme that, in the proportion used, is unobjectionable in taste and odor and incubating the resulting mixture until proteolysis of the casein has proceeded to the extent making the liberated tyrosine content of the incubated mixture approximately 0.004–0.025 part for 2.5 parts of the casein, the casein remaining insoluble in water at the isoelectric point after the said incubating and the said tyrosine being separable in soluble form from casein by phosphomolybdotungstic acid in water solution and in amount to precipitate the casein.

2. The process of claim 1, which includes subjecting the casein after the said incubating to oxidation until the ascorbic acid therein is oxidized.

3. The process of claim 2, the said oxidation being effected by admixing hydrogen peroxide.

4. In stabilizing the flavor of milk casein, the process which comprises forming a mixture of an aqueous dispersion of the casein containing not more than about 1.5% of fat on the weight of the casein with trypsin and incubating the resulting mixture until proteolysis of the protein of the casein has proceeded to the stage at which the casein remains insoluble in water at the isoelectric point and to the extent making the separable tyrosine content of the incubated product approximately 0.004–0.025 part for 2.5 parts of casein and subjecting the resulting mixture to oxidation until the ascorbic acid therein is substantially completely oxidized.

5. In stabilizing the flavor of milk, the process which comprises mixing the milk with an edible proteolytic enzyme that in the proportion used is substantially tasteless and incubating the resulting mixture until proteolysis of the protein of the milk has proceeded to the stage at which the casein remains insoluble in water at the isoelectric point and to the extent making the content of tyrosine that is separable from the casein in the incubated product approximately 0.004–0.025 part for 100 parts of the milk, subjecting the milk subsequent to the said incubating to oxidation until the ascorbic acid therein is oxidized, and then establishing the pH at about 6.6.

References Cited in the file of this patent
UNITED STATES PATENTS

| 750,832 | Dunham | Feb. 2, 1904 |
| 1,505,551 | Funk et al. | Aug. 19, 1924 |
| 2,473,255 | Parfentjev | June 14, 1949 |

FOREIGN PATENTS

| 115,354 | Australia | June 16, 1942 |